Dec. 24, 1940.　　　G. W. BLAKE　　　2,226,423
HEAT GENERATOR
Filed Oct. 4, 1939　　　2 Sheets-Sheet 1

Inventor
George W. Blake
By
Attorney

Dec. 24, 1940.　　　G. W. BLAKE　　　2,226,423
HEAT GENERATOR
Filed Oct. 4, 1939　　　2 Sheets-Sheet 2

Inventor
George W. Blake
By
Attorney

Patented Dec. 24, 1940

2,226,423

UNITED STATES PATENT OFFICE 2,226,423

HEAT GENERATOR

George W. Blake, Wyandotte, Mich.

Application October 4, 1939, Serial No. 297,794

8 Claims. (Cl. 122—26)

This invention relates generally to heating devices and more particularly to friction heat generators.

It is an object of the present invention to provide a new and improved friction heat generator for heating and circulating a heat transfer medium.

Another object of the invention is to provide a heat generator of the above mentioned character which is efficient in operation and inexpensive to manufacture.

Other objects of the invention will appear from the following detailed description taken in connection with the accompanying drawings in which—

Figure 1:
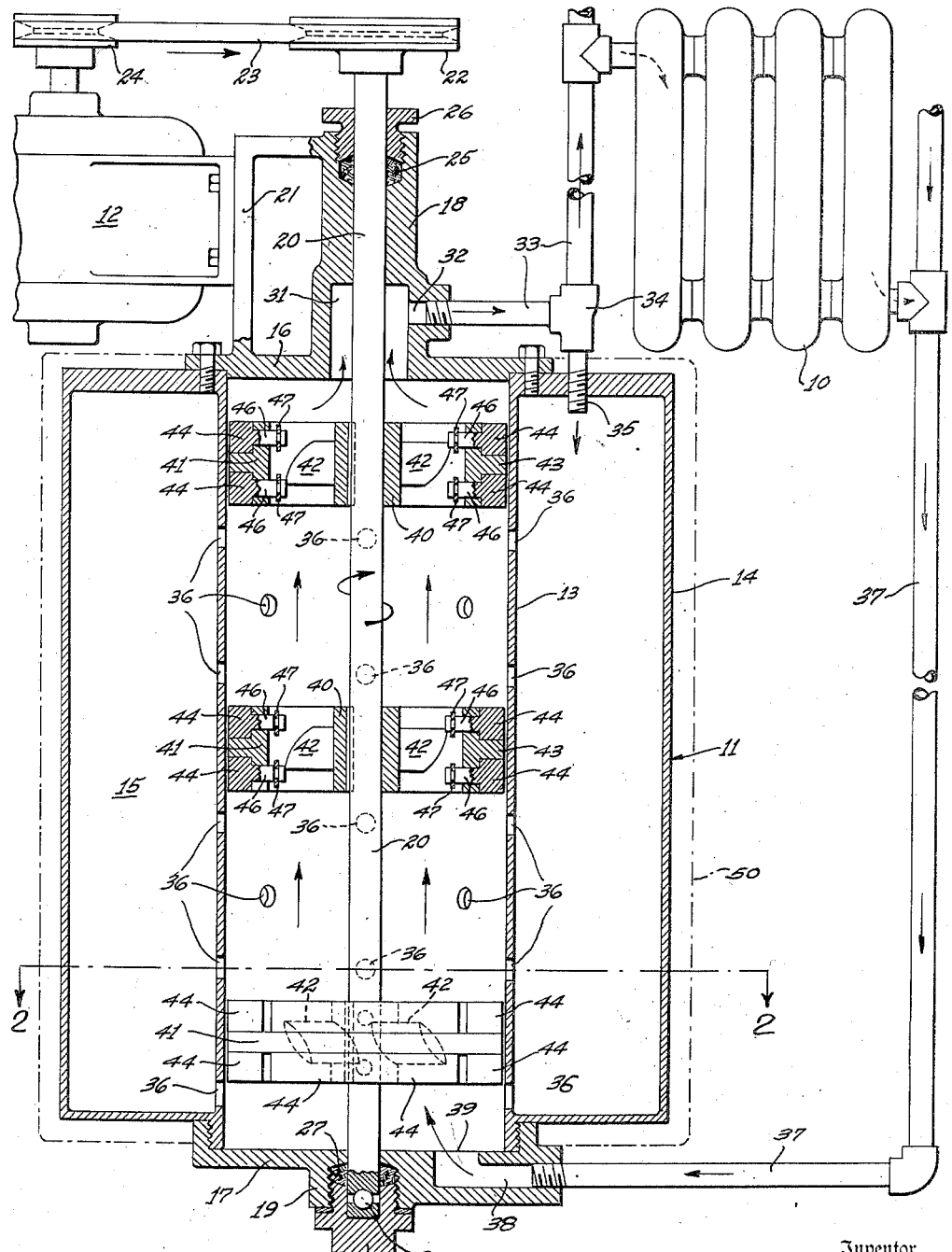
Figure 1 is a view partly in elevation and partly in section of a heating system including my heat generator.
Figure 2:
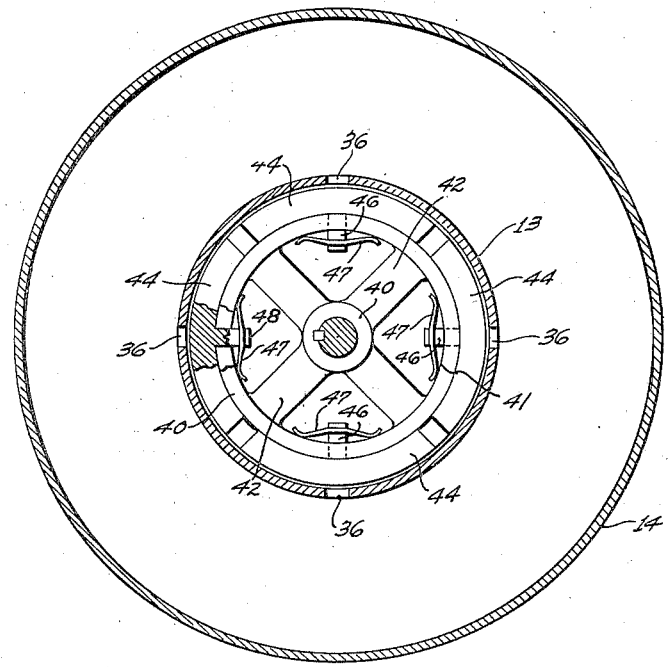
Fig. 2 is a cross sectional view of the heat generator taken along the line and in the direction of the arrows 2—2 of Fig. 1.
Figures 3, 4, 5, 6:
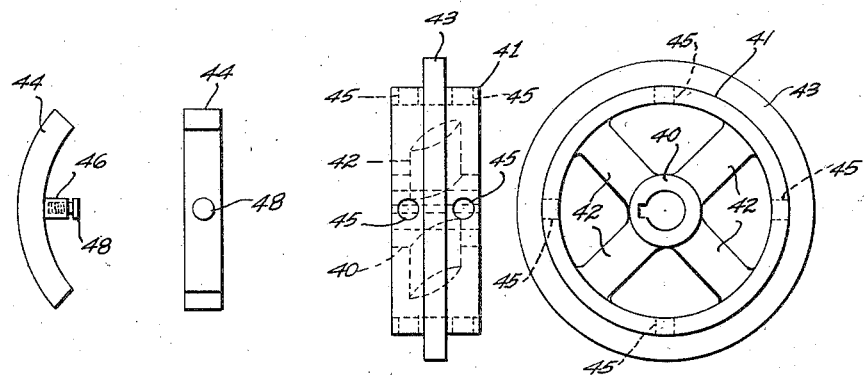
Figs. 3 and 4 are views in elevation of a part of the heat generator removed therefrom.
Figs. 5 and 6 are views in elevation of another part of the heat generator.

Referring to the drawings by characters of references, the heating system shown comprises in general, a radiator 10, a frictional heat generator 11 and a motor 12. The radiator 10 may be of any suitable type and the motor 12 may be an electric motor of suitable horsepower to drive the frictional heat generator 11.

The heat generator 11 includes an inner casing or drum 13 surrounded and enclosed by an outer casing or jacket 14 providing an annular chamber 15 therebetween for a heat transfer medium, such as, water or other suitable liquid. The inner casing 13 and the outer casing 14 are preferably tubular in form having a common longitudinal axis and although, as shown, the casings are formed integral, it will be understood that they may be made separate and be suitably secured together. The opposite open ends of the inner casing 13 are closed by removable top and bottom closure plates 16 and 17 respectively which may be rigidly secured to the casings by any suitable means and these closure plates 16 and 17 are provided with external hollow bosses 18 and 19 respectively in which a shaft 20, extending longitudinally and centrally through the inner casing 13, is rotatably supported. Cast integral with the closure member 16, a vertical mounting 21 is provided to which the electric motor 12 may be secured by bolts or by other suitable means. One or the upper end of the shaft 20 projects from the upper end of the boss 18 and secured to this end of the shaft, a driven pulley 22 may be provided and be driven by means of a belt 23 from a drive pulley 24 on the drive shaft of the electric motor 12.

In the outer or upper end of the boss 18, an enlarged bore may be provided for packing material 25 which surrounds the shaft 20 and may be held under compression, to prevent leakage of fluid along the shaft, by a packing nut 26. Similarly, the other or lower boss 19 may be provided with an enlarged bore to receive packing material 27 which may be held under compression by a packing nut 28, the packing nut 28 being provided in its inner end with a bored recess wherein a lower end portion of the shaft 20 is rotatably journaled and the lower end of the shaft preferably rests on a bearing 30.

In the closure plate 16 and extending into its boss 18 is provided an enlarged bore 31 which opens through the lower surface of the closure plate 16 into the inner casing 13, and leading laterally out of the bore 31 is an outlet bore 32 in which one end of a conduit 33 is secured, the other end of the conduit 33 being connected to the inlet of the radiator 10. From one of the fittings, as at 34, of the conduit 33 a branch pipe 35 is connected and secured in the closure plate 16 to return some fluid to the chamber 15 whence the fluid or liquid may enter the inner casing 13 through a plurality of apertures 36 provided in the cylindrical side wall of the inner casing. A return line or conduit 37 which may connect to one or more of the radiators 10 has one end secured in and to a bore 38 which is provided in the bottom closure plate 17 and opens upwardly, as at 39 into the inner casing 13.

Mounted in spaced relation on the shaft 20, within the inner casing 13, is a plurality of vertically spaced rotors, each having a hub 40 joined to a rim 41 by spokes 42, the hubs 40 each being keyed to the shaft 20 for rotation therewith. As shown, the spokes 42 are formed and are angularly disposed such that they act to propel liquid in the direction of the arrows, circulating the liquid through the system to aid gravity circulation. The rims 41 are each formed with an external continuous flange 43 providing an extended outer peripheral surface substantially midway of the opposite sides of respective rims and the peripheries of these flanges are in close proximity to the inner wall surface of the inner tubular casing 13. On each side of the flange 43 of each rotor is provided and loosely carried a plurality of radially spaced, arcuate friction members or shoes 44, the outer convex surfaces of which conform to the inner wall surface of the casing 13, and in operation of the device these friction shoes 44 engage said surface to generate heat by friction for transfer to the liquid in the casing 13 and in the surrounding chamber 15. Through the rim 40, a plurality of radially spaced apertures 45 is provided and each of the friction shoes 44 is provided with an integral extension or pin 46 which project radially from the concave side of the shoes 44, these pins being respectively and sufficiently loosely received in the rim apertures 45 such that the shoes may move radially for a purpose hereinafter described. Each of the friction shoes 44 is yieldably urged inwardly toward their respective rims 40 by springs 47 which may be leaf springs or any other suitable type of light springs which will hold the shoes 44 out of contact with the inner surface of the casing 13 when the motor 12 is stopped and until such time as the electric motor 12 gains momentum sufficiently to easily take on the friction load which occurs when the springs 47 are overcome by the centrifugal force. The opposite ends of the leaf springs 47 are preferably rounded, as shown, for abutting the inner surface of the rims 41 and intermediate these ends, each spring may be provided with an aperture to receive a screw 48 which screwthreads into the ends of respective shoe pins 46, the heads of the screws 48 abutting the springs to hold them under the proper or desired tension.

In operation, the motor 12, through the belt drive 23, rotates shaft 20 and consequently rotates the spaced rotors keyed to the shaft. Before the motor 12 is started, the springs 47 yieldably hold the shoes 44 inwardly against their respective rims 40 out of engagement with the inner surface of the casing 13 so that, as previously mentioned, the motor 12 will not have to start under full load. As the motor 12 gains momentum, the centrifugal force resulting from rotation of the rotors overcomes the light springs 47 forcing the shoes 44 outwardly into contact with the inner wall surface of the casing 13 whereby to generate heat by friction. This heat is given off to the surrounding liquid in the inner casing 13 and to the liquid in the surrounding chamber 15 from which chamber liquid also flows through apertures 36 into the inner casing 13. The liquid in the system is caused to circulate by gravity and by the propeller-like spaced spokes 42 of the friction rotors, the liquid passing through bore 31 into conduit 33, through radiator 10 and return through conduit 37 to the lower end of the inner container 13 through the inlet 36. The liquid in the chamber 15 absorbs heat from the side wall of the tubular inner casing 13 and also from the outer casing 14 which is in heat conducting relation with the inner casing, the outer casing preferably being enclosed by suitable heat insulating material indicated in dot and dash lines 50 to reduce heat loss. The liquid from chamber 15 is drawn into the inner casing 13 through the apertures 36 by gravity and by the propeller-like rotor spokes 42 for circulation through the system, some of the heated liquid or steam preferably being by-passed to the chamber 15 through the branch pipe 35.

While I have shown and described my invention in detail it is to be understood that the same is to be limited only by the appended claims for many changes may be made without departing from the spirit and scope of the invention.

What I claim is:

1. A friction heat generator comprising, a hollow casing for flow of a liquid therethrough and having an inlet and an outlet, a rotor in said casing, a friction shoe carried by said rotor and arranged to move relatively thereto outwardly into engagement with the inner wall surface of said casing to generate heat by friction for transfer to the liquid, means associated with said rotor within said casing to propel liquid therethrough, and yieldable means arranged to act radially to the axis of rotation of said rotor to hold said shoe inwardly away from said wall surface until said rotor reaches a desired speed.

2. A friction heat generator comprising, a hollow casing for flow therethrough of a liquid and having an inlet and an outlet, a rotor within said casing, means rotatable with said rotor within said casing to propel liquid therethrough, a plurality of radially spaced friction shoes carried by said rotor to engage the inner wall surface of said container to generate heat, said shoes being arranged to move radially relative to the axis of said rotor by centrifugal force on rotation of the rotor, and spring means individually urging said shoes inwardly toward the axis of said rotor and operable to prevent engagement of said shoes with the inner wall surface of said container until said rotor has gained desired momentum.

3. In a friction heater, a rotor, a plurality of radially spaced arcuate friction shoes mounted on the outer periphery of said rotor and arranged to move radially thereto, said shoes moving outwardly to engage cooperating friction means to generate heat, means on said rotor to propel liquid into heat transfer relation with said friction means, and spring means yieldingly urging said shoes inwardly and overcome by centrifugal force effected by rotation of said rotor.

4. In a friction heater, a casing for flow of liquid therethrough and having an inlet and an outlet, a rotor in said casing and having a hub and a rim, a plurality of spokes spaced for flow of liquid therebetween and attaching the hub to the rim, said spokes being arranged to propel the liquid through said casing for delivery to a point of use of the heat, and a plurality of radially spaced and radially movable friction shoes carried by said rim for engagement with cooperating friction means to heat the liquid flowing through said casing.

5. In a friction heater, a casing, a rotor in said casing and having a hub and a rim, a plurality of spokes spaced for flow of liquid therebetween and attaching the hub to the rim, said spokes being arranged to propel liquid through said casing, a plurality of radially spaced and radially movable friction shoes carried by said rims for engagement with cooperating friction means to heat the liquid passing through said casing, and yieldable means opposing outwardly radial movement of said shoes by centrifugal force.

6. In a friction heat generator, an inner casing having an inlet and an outlet, an outer casing surrounding said inner casing and cooperable therewith to provide a chamber for liquid surrounding said inner casing, said outer casing having an inlet, apertures through a wall of said inner casing for flow of liquid from said chamber into said inner casing, a rotor within said inner casing having means for propelling the liquid to discharge liquid from said outlet, and friction shoes carried by said rotor and cooperable with said inner casing to generate heat for transfer to the liquid in said inner casing and in said chamber.

7. In a friction heat generator, an inner upstanding tubular casing having a lower inlet and an upper outlet for liquid, an outer casing surrounding said inner casing in spaced relation thereto to provide a chamber for liquid, apertures in the side wall of said inner casing for flow of liquid from said chamber into said inner casing, a vertical shaft extending within said inner casing, a plurality of rotors mounted on said shaft in vertical spaced relation, and friction shoes carried by said rotor for engaging the inner side wall surface of said inner casing.

8. In a friction heater, a vertically extending tubular casing having an open upper end, an inlet adjacent the lower end of said casing, a removable closure member closing the upper end of said casing and having an outlet for liquid in said casing, a vertical and rotatable shaft in said casing, a plurality of vertically spaced rotors mounted on said shaft for rotation therewith, radially movable friction shoes carried by said rotors for engagement with the inner wall surface of said casing to generate heat for transfer to the liquid, and a motor mounted on said closure member and driving said shaft.

GEORGE W. BLAKE.